(12) United States Patent
Mai

(10) Patent No.: US 11,879,761 B2
(45) Date of Patent: Jan. 23, 2024

(54) PRECISION METERING UNIT FOR FINE/GRAINED POWDERS

(71) Applicant: LCM S.R.L., Caselle Lurani (IT)

(72) Inventor: Pietro Mai, Caselle Lurani (IT)

(73) Assignee: LCM S.R.L., Caselle Lurani (IT)

( * ) Notice: Subject to any disclaimer, the term of this patent is extended or adjusted under 35 U.S.C. 154(b) by 372 days.

(21) Appl. No.: 17/428,727

(22) PCT Filed: Feb. 13, 2020

(86) PCT No.: PCT/IB2020/051193
§ 371 (c)(1),
(2) Date: Aug. 5, 2021

(87) PCT Pub. No.: WO2020/165827
PCT Pub. Date: Aug. 20, 2020

(65) Prior Publication Data
US 2022/0107216 A1    Apr. 7, 2022

(30) Foreign Application Priority Data

Feb. 14, 2019    (IT) .......................... 102019000002167

(51) Int. Cl.
*G01F 11/18* (2006.01)
*G01F 11/00* (2006.01)

(52) U.S. Cl.
CPC ............ *G01F 11/18* (2013.01); *G01F 11/006* (2013.01)

(58) Field of Classification Search
None
See application file for complete search history.

(56) References Cited

U.S. PATENT DOCUMENTS

| 4,582,101 A | 4/1986 | Graffin |
| 5,871,081 A | 2/1999 | Gaalswyk et al. |
| 6,121,556 A | 9/2000 | Cole |

FOREIGN PATENT DOCUMENTS

EP    3333553 A1    6/2018

OTHER PUBLICATIONS

International Search Report and Written Opinion for Corresponding International Application No. PCT/IB2020/051193 (dated May 29, 2020) (12 Pages).

*Primary Examiner* — Harshad R Patel
(74) *Attorney, Agent, or Firm* — Lucas & Mercanti, LLP

(57) ABSTRACT

A fine grain powder metering unit for fine-grained powders combines the volumetric metering mode with the weighing mode, using for pre-metering 95-99% of the required quantity a volumetric drawer which is then emptied into the tray of a precision scale where a low-flow feeder feeds the powder for metering the final 1-5%, so as to combine the advantages of both metering modes and quickly achieve a metering with high accuracy and repeatability, automatically and with a simple and reliable structure.

20 Claims, 5 Drawing Sheets

PRECISION METERING UNIT FOR FINE/GRAINED POWDERS

CROSS-REFERENCE TO RELATED APPLICATIONS

This application is a 371 of PCT/IB2020/051193, filed Feb. 13, 2020, which claims the benefit of Italian Patent Application No. 102019000002167, filed Feb. 14, 2019.

FIELD OF THE INVENTION

The present invention concerns a metering unit capable of metering fine-grained powders with high accuracy and in a short time, and in particular a similar metering unit used to meter gunpowder into an automatic ammunition loading machine. In the following, specific reference will be made to this particular application of the present metering unit, but what is said also applies to the use of the metering unit in other applications where there is the same technical problem of obtaining a high metering accuracy, of the order of 1 part out of 4000, on a quantity of powder exceeding 1 g, for example in the pharmaceutical or food industry.

BACKGROUND OF THE INVENTION

It is known that metering of powders is basically performed in two modes, the volumetric mode or the weighing mode, performed respectively with a volumetric metering unit and a precision scale, typically with a load cell. In the first case the metering is quite fast because it is sufficient to fill the drawer of the volumetric metering unit, but the achievable precision is limited because the filling of the drawer is influenced by the characteristics of the powder (granulometry, flow, tendency to adhesion, etc.) which in turn can also be affected by the environmental conditions (e.g. temperature and humidity) in which the metering is carried out.

In the second case the metering can be much more precise if the powder is fed slowly in small quantities, so that the scale can continuously provide the reached weight data to the control unit that regulates the operation of the metering unit according to this feedback, until the exact weight required is reached with a tolerance of even 1 mg.

However, both modes are inadequate when such a minimum tolerance is required but on a relatively large quantity (a few grams) as is the case of ammunitions for specific experimental and non-commercial use. In fact, the volumetric mode allows to obtain a minimum tolerance in the order of 20 mg, while the weighing mode with a precise feeder with a low flow rate takes too long to dose the required quantity, and even the combination of such a feeder with a second feeder with a high flow rate that is faster in dispensing the powder is not satisfactory, in addition to the problem of the increased cost and complexity of a metering unit with double feeder.

U.S. Pat. No. 6,121,556 describes such a metering unit, with a first feed hopper for precision metering and a second feed hopper for fast initial filling. This second high-flow feeder is not precise enough, taking into account also the time required for feedback control, to have the required tolerance not even to deliver only 90% of the dose and leave the last 10% to the low-flow feeder to finish, so it can be used to deliver only about 70-80% of the dose and consequently it still takes too long to finish the metering with the other feeder. To reach the same precision standards, the only alternative is a manual production with the help of a precision scale, but the production capacity is at most 200 pieces/hour with the constraint of a dedicated operator.

SUMMARY OF THE INVENTION

The object of this invention is therefore to provide a metering unit that is free from the above-described drawbacks. This object is achieved by means of a metering unit that combines the volumetric mode with the weighing mode, using a volumetric drawer for the pre-metering of 95-99% of the required quantity, which is then emptied into the tray of a precision scale in which a low-flow feeder feeds the powder for the metering of the final 1-5%. Further advantageous features of this metering unit are specified in the dependent claims.

The main advantage of this metering unit therefore lies in the fact that it combines the advantages of both metering modes, making it possible to obtain a tolerance of 1 mg even on a 4000 mg dose but within a few seconds, so that the production capacity can reach even more than 500 pieces/hour, with high repeatability and ability to adapt to different powder characteristics and varying environmental conditions.

A second significant advantage of this metering unit is that it is manufactured with a quite simple, inexpensive and robust structure that guarantees limited production and maintenance costs and high reliability.

BRIEF DESCRIPTION OF THE DRAWINGS

Further advantages and characteristics of the metering unit according to the present invention will be evident to those skilled in the art from the following detailed and not limiting description of a preferred embodiment thereof with reference to the annexed drawings in which.

DETAILED DESCRIPTION OF THE INVENTION

Figure 1:
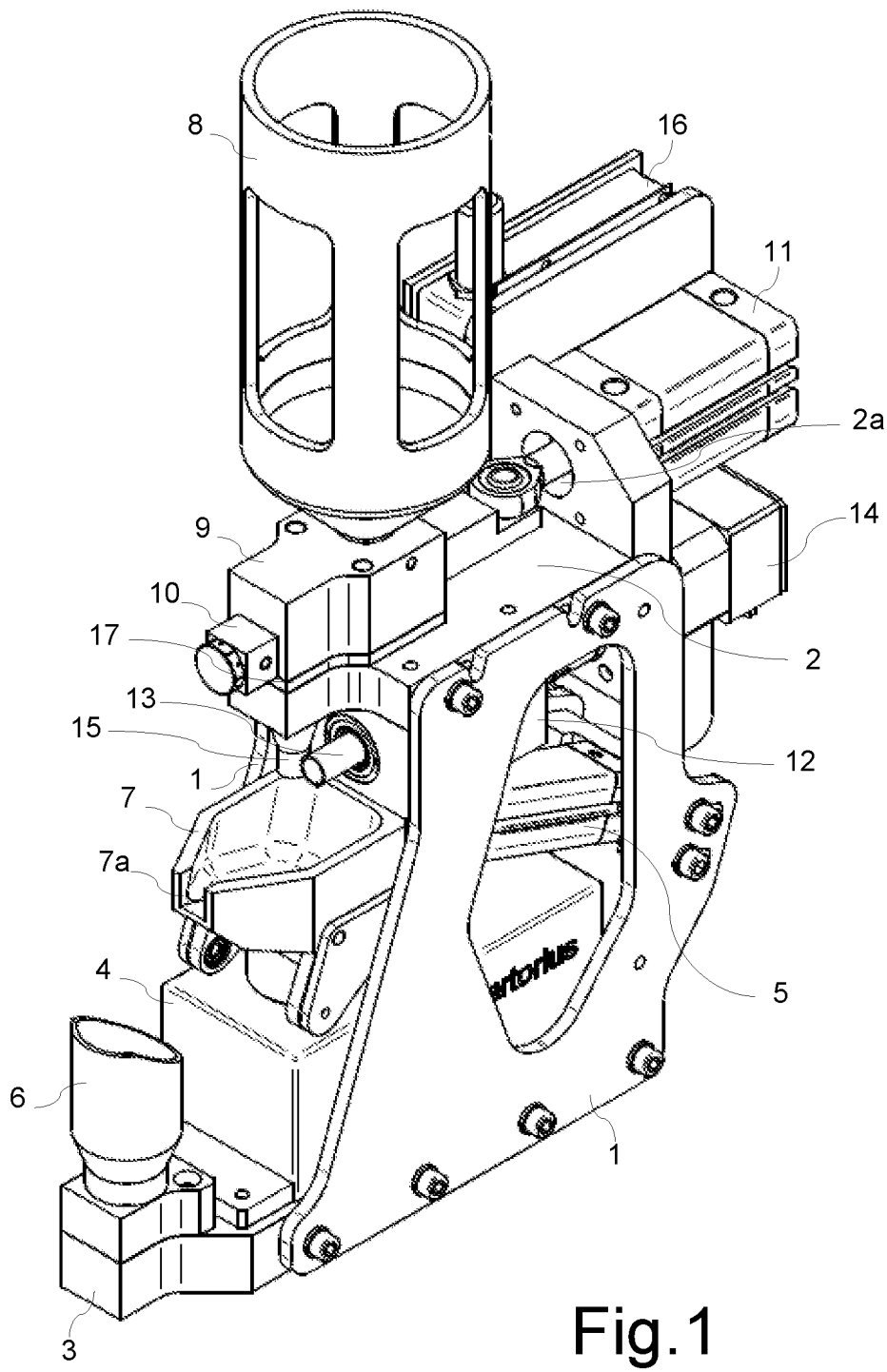
FIG. 1 is a top perspective view of the metering unit.
Figure 2:
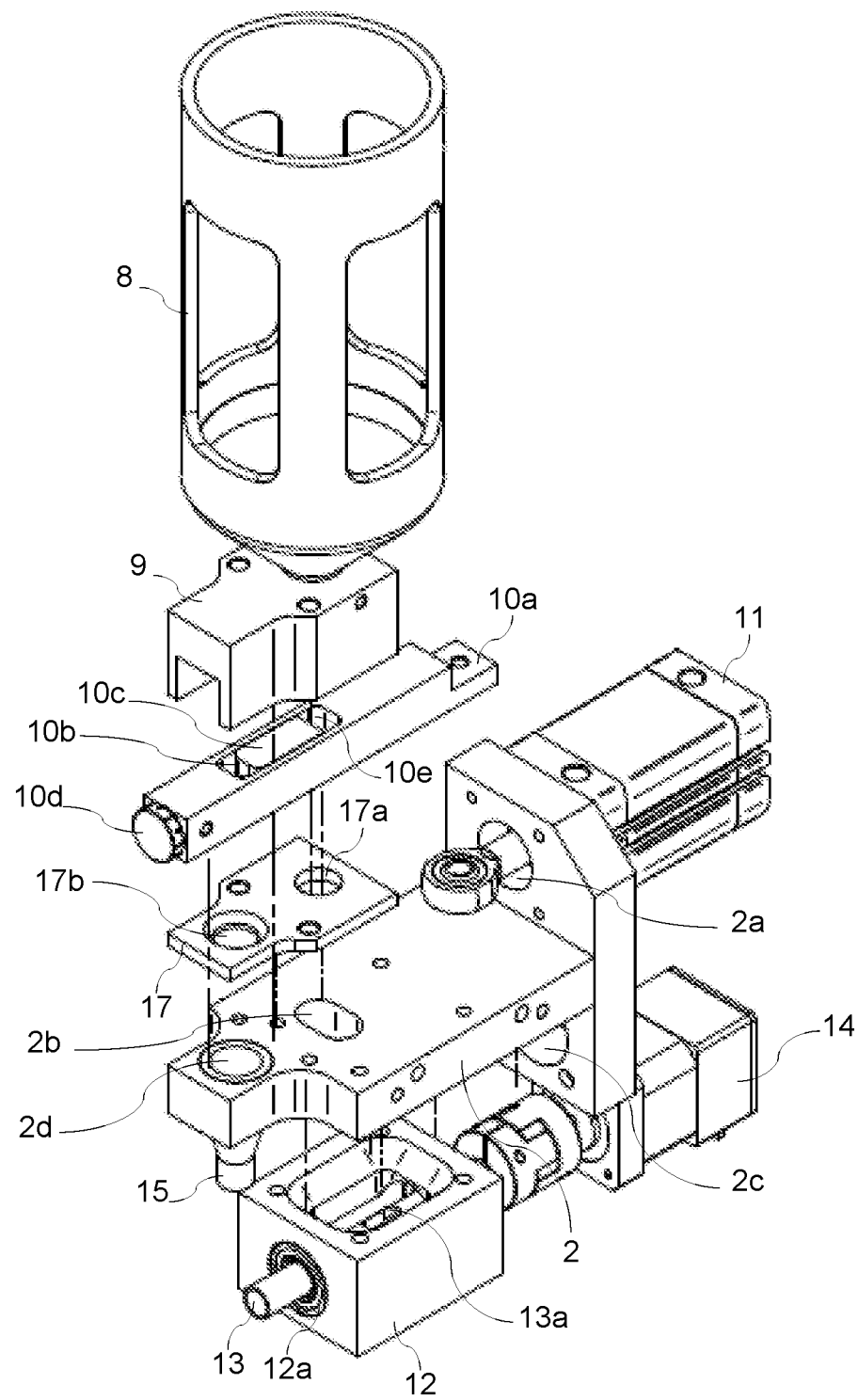
FIG. 2 is an exploded top perspective view of the upper portion of the metering unit.
Figure 4:
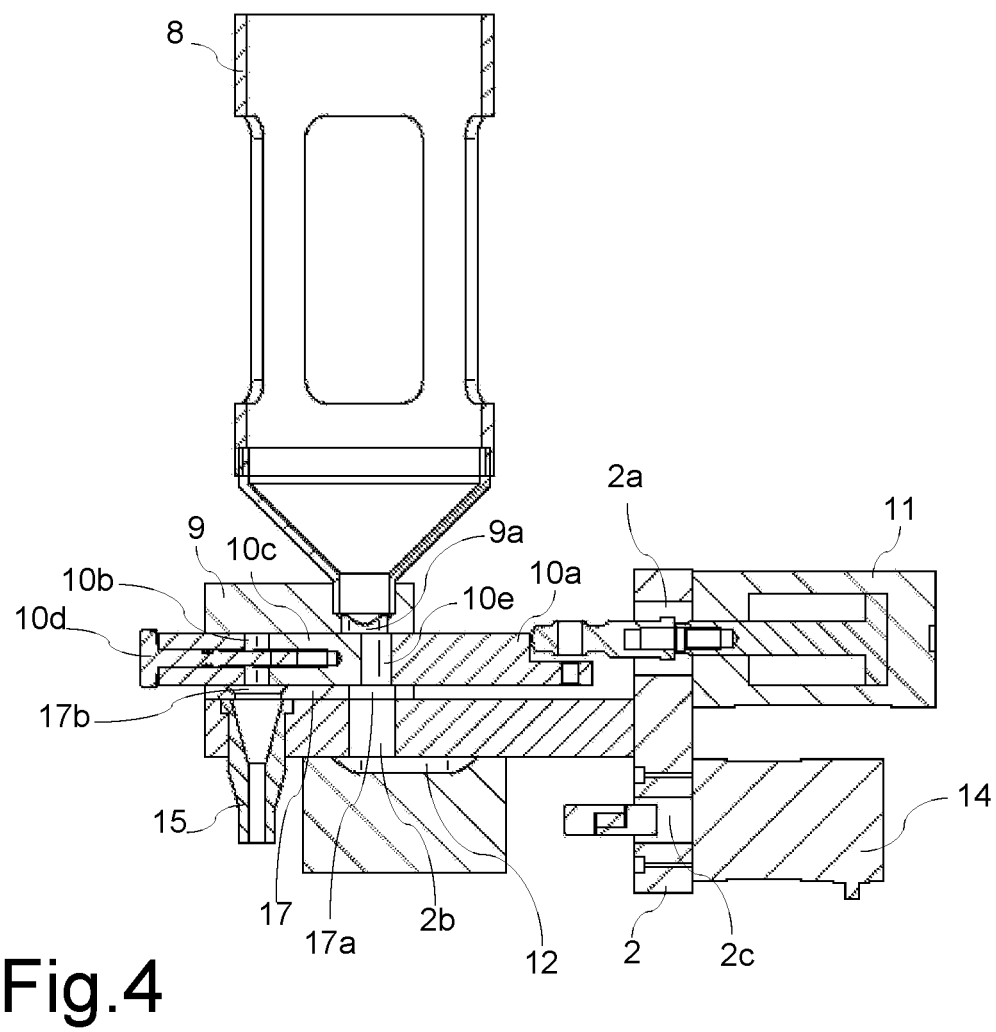
FIG. 4 is a vertical sectional view along line IV-IV of FIG. 3.
Figure 3:
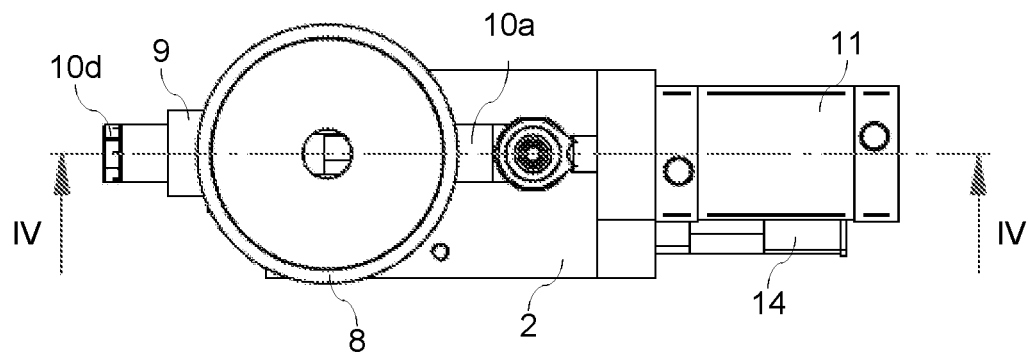
FIG. 3 is a top plan view of the portion of FIG. 2 in assembled condition and with the volumetric drawer in the filling position.

Referring to FIGS. 1 to 6, there is seen that a metering unit according to the present invention comprises a support structure substantially made up of two sides 1 carrying between them an upper plate 2 shaped as a horizontal T and a lower plate 3 extending forward, as well as a scale 4 located behind the lower plate 3 and a first actuator cylinder 5 located above scale 4. The other components of the metering unit are all mounted directly or indirectly on plates 2, 3 and scale 4.

More specifically, the lower plate 3 carries a discharge pipe 6 which receives the precise dose of gunpowder from a weighing tray 7 mounted on scale 4 so that it rotates around a horizontal transversal axis, under the action of the first actuator cylinder 5, between the filling position shown in FIG. 1 and an emptying position (not shown) where the powder is poured into the discharge pipe 6 through a front spout 7a of tray 7.

A hopper 8 for loading the gunpowder, either manually or by means of a tube connected to an external automatic feeder, is mounted on a support 9 having a substantially inverted U-shaped cross-section. In this way, a volumetric drawer 10, described in detail below, can slide longitudinally back and forth through said support 9 which is fixed on the upper face of the horizontal arm of the upper plate 2. The longitudinal reciprocating motion of drawer 10 is provided by a second actuator cylinder 11, which is mounted on the rear face of the upper plate 2 and is connected to drawer 10 through a first hole 2a in the vertical arm of the upper plate 2.

A second hole 2b is formed in the horizontal arm of the upper plate 2 at the bottom outlet of hopper 8 to connect it, through a vertical hole 9a in support 9 and drawer 10, with a final metering chamber 12 which is mounted on the bottom face of the horizontal arm of the upper plate 2. In this way, the gunpowder coming down from hopper 8 first fills said chamber 12 and then drawer 10.

A metering tube 13, better described later, extends longitudinally through chamber 12 so that it protrudes in front above tray 7 and from the rear to connect to a variable speed motor 14 which rotates it. Also motor 14 is mounted on the rear face of the upper plate 2, below the second actuator cylinder 11, and is connected to tube 13 through a third hole 2c in the vertical arm of the upper plate 2.

A fourth hole 2d is formed in the horizontal arm of the upper plate 2 at tray 7, and receives a cane 15 that extends downwards to a position adjacent to the front end of the metering tube 13. Finally, a control unit 16 is mounted on the side face of the vertical arm of the upper plate 2 and is operationally connected to scale 4, motor 14 and the two actuator cylinders 5, 11.

The volumetric drawer 10 consists of a drawer body 10a in which there is formed an elongated vertical opening 10b housing a slider 10c that slides longitudinally under the action of a front adjustment screw 10d, which engages a longitudinal threaded hole obtained in slider 10c. The space between the rear end of slider 10c and the rear end of opening 10b defines the volumetric metering chamber 10e, whose length can thus be varied through the adjustment screw 10d according to the amount of gunpowder to be metered.

The volumetric drawer 10 is therefore adjusted to typically reach a quantity of gunpowder equal to about 95-99% of the quantity to be metered: for example, for a quantity of 4000 mg chamber 10e can be sized to receive 3970 mg with a tolerance of ±20 mg, so that the final metering involves only a quantity between 10 and 50 mg. This final quantity is loaded into tray 7 by the metering tube 13, which is provided with a filling slot 13a in the portion at the final metering chamber 12, on which tube 13 is rotatably mounted being supported by sealing rings 12a.

Figure 6:
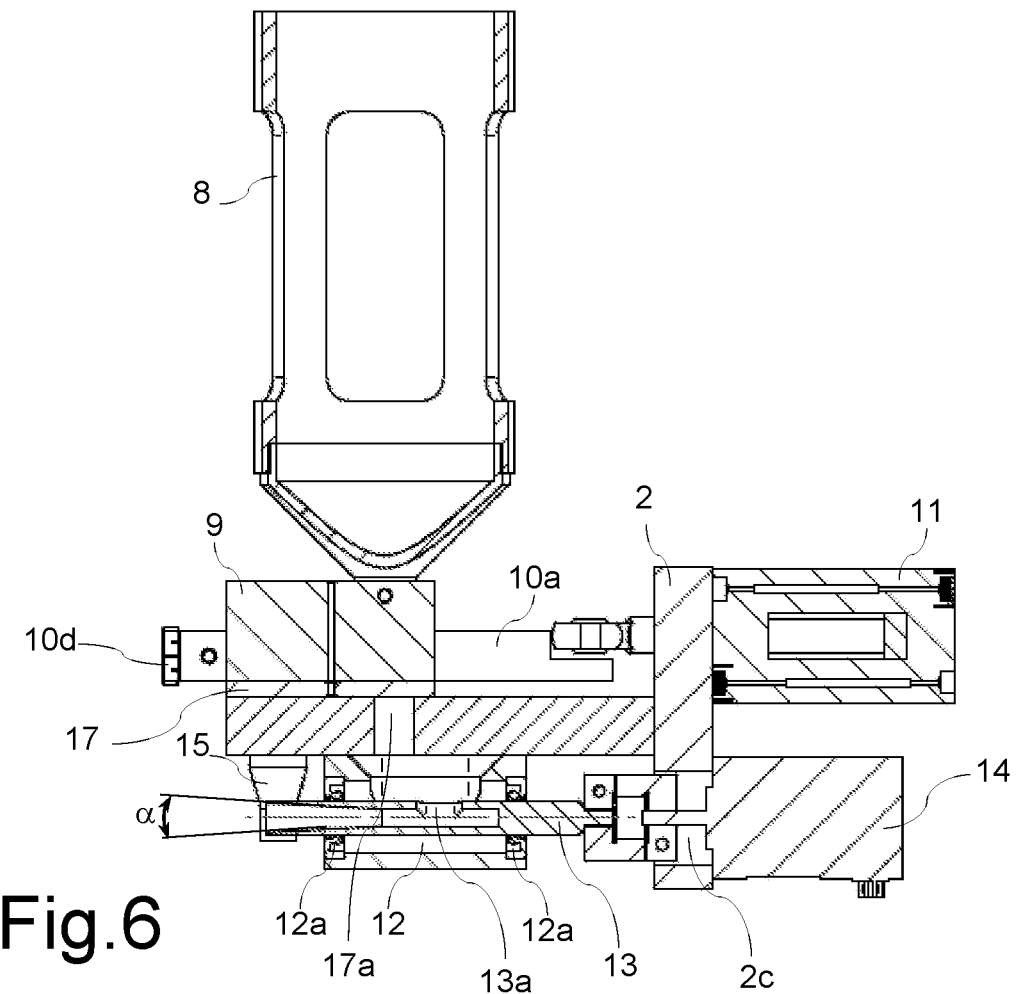
FIG. 6 is a vertical sectional view along line VI-VI of FIG. 5.
Figure 5:
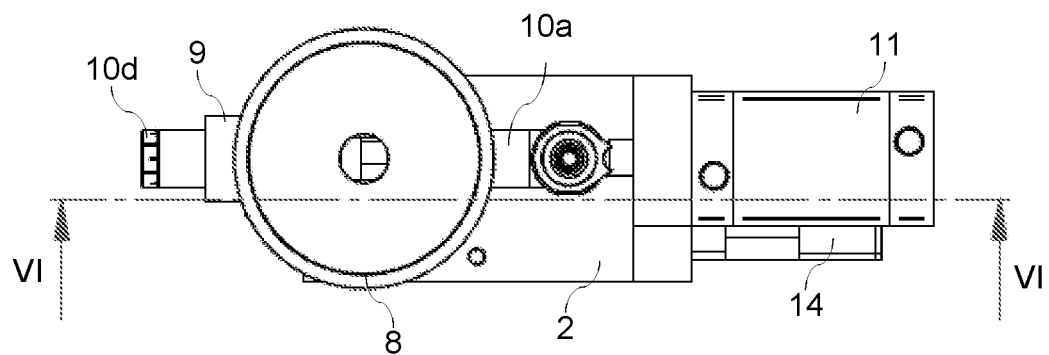
FIG. 5 is a view equal to FIG. 3 but with a different section line.

The gunpowder then enters tube 13 through slot 13a and proceeds towards the front end of tube 13 due to the rotation given by motor 14 and, preferably, also thanks to a slight flare of the internal surface of tube 13 which may have a taper α of some degrees (e.g. 6°) so that the powder proceeds along a surface with a small inclination towards the front end of tube 13 (FIG. 6).

Figure 8:
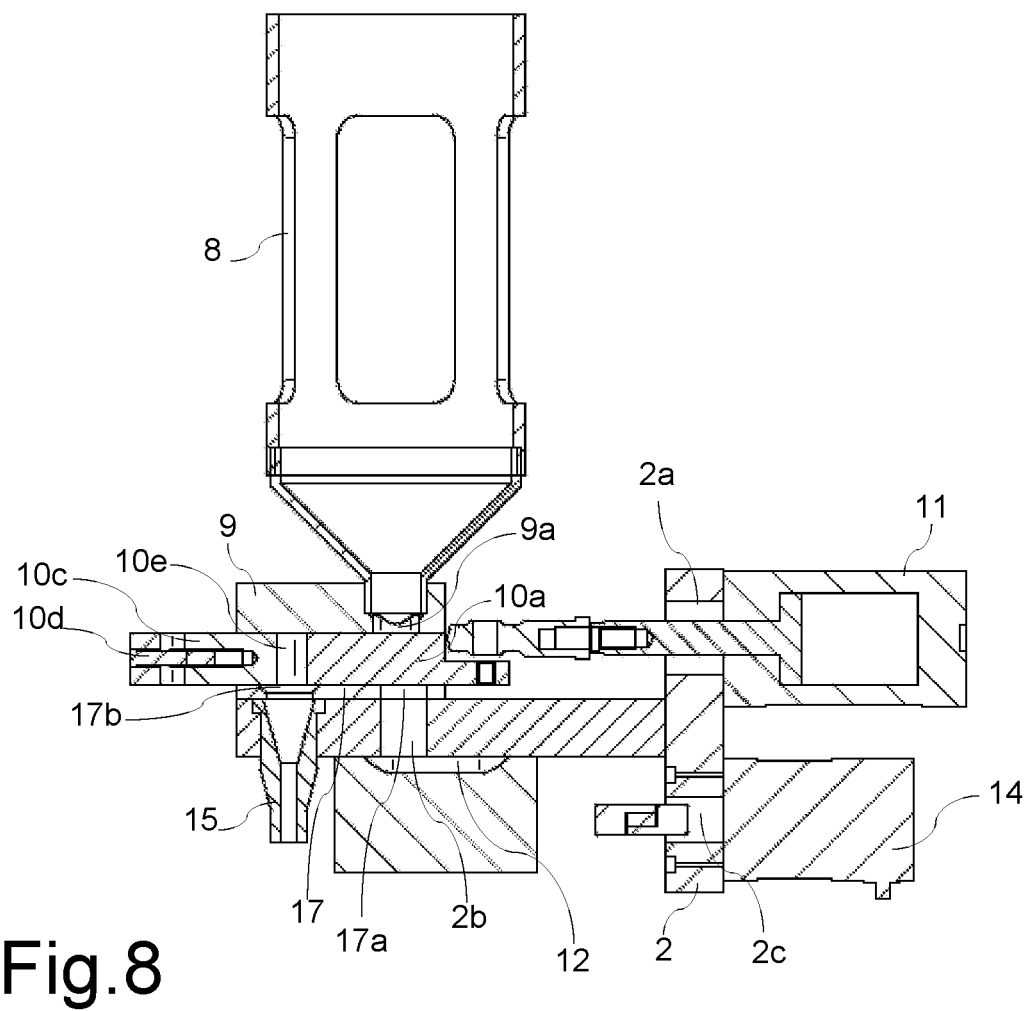
FIG. 8 is a vertical sectional view along line VIII-VIII of FIG. 7.
Figure 7:
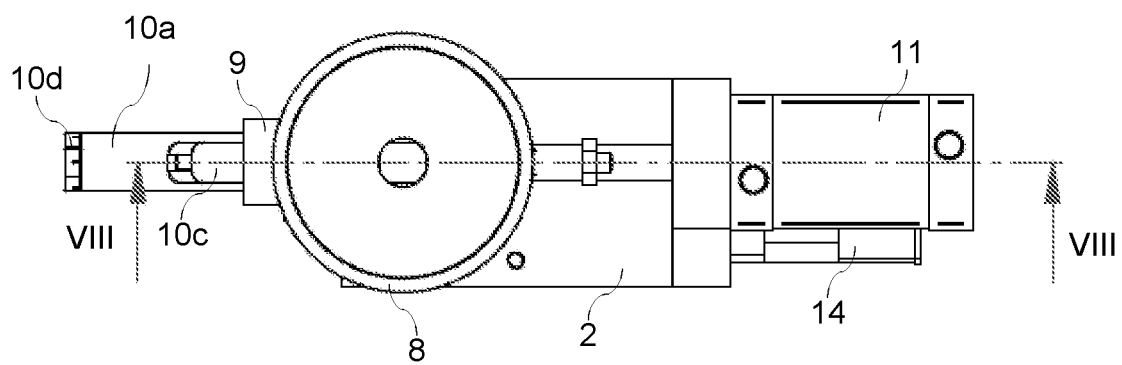
FIG. 7 is a view similar to FIG. 3 but with the volumetric drawer in the emptying position.

From the description above, and with the help of FIGS. 7 and 8, the simple and effective operation of this metering unit is readily understood.

As mentioned above, the volumetric metering chamber 10e is filled with the powder that descends by gravity from hopper 8 through hole 9a in support 9 (FIG. 4), after which the second actuator cylinder 11 pushes the volumetric drawer 10 forward until chamber 10e is brought to cane 15 (FIG. 8), so that the quantity of powder metered in chamber 10e is emptied into the weighing tray 7. The scale 4 checks the exact weight of the powder present in tray 7 and sends the data to the control unit 16 which drives motor 14 which turns the metering tube 13 at a preset speed (e.g. the speed of motor 14 can vary between 0 and 120 rpm).

The gunpowder, coming from the final metering chamber 12 through slot 13a, then starts to flow out from tube 13 and falls into tray 7. The scale 4 continuously sends the powder weight value to the control unit 16, which reduces the rotation speed of motor 14 (and therefore of tube 13) as the detected weight approaches the preset weight, until it comes to a complete stop when the detected weight is exactly the desired one.

The exact dose of gunpowder present in the weighing tray 7 is then automatically emptied into the discharge pipe 6 through spout 7a by means of the first actuator cylinder 5, as mentioned above, tray 7 is then brought back to the filling position by cylinder 5, the volumetric drawer 10 is brought back to the filling position by the second actuator cylinder 11, and at this point the metering unit is ready to perform the next cycle.

Note that the volumetric drawer 10 preferably does not rest directly on the upper plate 2 but on a small plate 17 placed between them (FIG. 2), which is obviously provided with passages 17a and 17b respectively at the holes 2b and 2d of the upper plate 2. The purpose of the small plate 17 is to prevent the wear of plate 2, which is typically made of a light and relatively soft metal such as aluminum so as not to make it too heavy, due to the sliding of the volumetric drawer 10, which is typically made of a harder and heavier material to ensure the seal of chamber 10e and the closure of hole 9a during its reciprocating motion.

It is therefore evident that with the metering unit according to the present invention it is possible to quickly achieve a metering with high precision and repeatability, in an automatic way and with a simple and reliable structure.

It is clear that the embodiment of the metering unit according to the invention described and illustrated above is only an example susceptible of numerous variations. In particular, the type and arrangement of the actuator means that drive tray 7, drawer 10 and tube 13 can vary somewhat according to specific construction requirements as long as the functionality described above is maintained.

The invention claimed is:
1. A metering unit for fine-grained powders including
a hopper for loading the powder,
a support provided with a vertical hole in correspondence with a bottom outlet of said hopper which is mounted on said support,
a volumetric drawer provided with a volumetric metering chamber, said volumetric drawer movable back and forth through the support between a filling position, in which said volumetric metering chamber is filled by the powder that descends by gravity from the hopper through said vertical hole in the support, and an emptying position, in which the volumetric metering cham- ber is emptied of the powder that descends by gravity through a hole formed in a plate on which the support is mounted, and an actuator that provides the volumetric drawer with said back and forth motion, characterized in that wherein the metering unit further includes a final metering chamber, placed under said plate and communicating with the volumetric metering chamber through a second hole formed in the plate in correspondence with said filling position, a metering tube that extends through said final metering chamber so as to protrude in front with an end in correspondence with said emptying position, said metering tube being provided with a slot for the entry of the powder formed in a metering tube portion contained in the final metering chamber, a variable-speed motor that turns the metering tube, a weighing tray placed in correspondence with the emptying position so as to receive the powder from the volumetric metering chamber and from the metering tube, a scale that carries the weighing tray and constantly records the exact weight of the powder contained therein;

a second actuator which empties the weighing tray into a discharge pipe, and a control unit operatively connected to said scale, to both the actuators and to said variable-speed motor so as to control the operation of the actuators and of the motor on the basis of the weight of the powder detected by the scale.

2. The metering unit according to claim 1, wherein an internal surface of the metering tube has a slight flare towards an end with a taper ($\alpha$).

3. The metering unit according to claim 2, wherein the flare of the taper ($\alpha$) is of 6°.

4. The metering unit according to claim 1, wherein a small plate is placed between the volumetric drawer and the plate, said small plate being provided with passages in correspondence with the holes formed in the plate.

5. The metering unit according to claim 4, wherein the weighing tray is mounted on the scale so as to rotate around a horizontal transversal axis and is provided with a front spout.

6. The metering unit according to claim 4, wherein the variable-speed motor rotates the metering tube at a speed between 0 and 120 rpm.

7. The metering unit according to claim 4, wherein the metering tube protrudes from the rear of the final metering chamber to connect to the variable-speed motor.

8. The metering unit according to claim 4, wherein the volumetric drawer consists of a drawer body in which an elongated vertical opening is formed that houses a slider sliding therein under the action of an adjustment screw that engages a longitudinal threaded hole formed in said slider, the volumetric metering chamber being defined by the space between a rear end of the slider and a rear end of said elongated vertical opening.

9. The metering unit according to claim 1, wherein the weighing tray is mounted on the scale so as to rotate around a horizontal transversal axis and is provided with a front spout.

10. The metering unit according to claim 9, wherein the variable-speed motor rotates the metering tube at a speed between 0 and 120 rpm.

11. The metering unit according to claim 9, wherein the metering tube protrudes from the rear of the final metering chamber to connect to the variable-speed motor.

12. The metering unit according to claim 9, wherein the volumetric drawer consists of a drawer body in which an elongated vertical opening is formed that houses a slider sliding therein under the action of an adjustment screw that engages a longitudinal threaded hole formed in said slider, the volumetric metering chamber being defined by the space between a rear end of the slider and a rear end of said elongated vertical opening.

13. The metering unit according to claim 1, wherein the variable-speed motor rotates the metering tube at a speed between 0 and 120 rpm.

14. The metering unit according to claim 13, wherein the metering tube protrudes from the rear of the final metering chamber to connect to the variable-speed motor.

15. The metering unit according to claim 13, wherein the volumetric drawer consists of a drawer body in which an elongated vertical opening is formed that houses a slider sliding therein under the action of an adjustment screw that engages a longitudinal threaded hole formed in said slider, the volumetric metering chamber being defined by the space between a rear end of the slider and a rear end of said elongated vertical opening.

16. The metering unit according to claim 1, wherein the metering tube protrudes from a rear of the final metering chamber to connect to the variable-speed motor.

17. The metering unit according to claim 16, wherein the volumetric drawer consists of a drawer body in which an elongated vertical opening is formed that houses a slider sliding therein under the action of an adjustment screw that engages a longitudinal threaded hole formed in said slider, the volumetric metering chamber being defined by the space between a rear end of the slider and a rear end of said elongated vertical opening.

18. The metering unit according to claim 1, wherein the metering tube is rotatably mounted on the final metering chamber by of sealing rings.

19. The metering unit according to claim 18, wherein the volumetric drawer consists of a drawer body in which an elongated vertical opening is formed that houses a slider sliding therein under the action of an adjustment screw that engages a longitudinal threaded hole formed in said slider, the volumetric metering chamber being defined by the space between a rear end of the slider and a rear end of said elongated vertical opening.

20. The metering unit according to claim 1, wherein the volumetric drawer consists of a drawer body in which an elongated vertical opening is formed that houses a slider sliding therein under the action of an adjustment screw that engages a longitudinal threaded hole formed in said slider, the volumetric metering chamber being defined by the space between a rear end of the slider and a rear end of said elongated vertical opening.

* * * * *